United States Patent
Utley et al.

(10) Patent No.: US 11,031,602 B2
(45) Date of Patent: Jun. 8, 2021

(54) ELECTRIC VEHICLE BATTERY CURRENT COMMUNICATION DEVICE

(71) Applicant: Ford Global Technologies, LLC, Dearborn, MI (US)

(72) Inventors: Brian Utley, Canton, MI (US); Debbi Callicoat, Livonia, MI (US); Keith Kearney, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 67 days.

(21) Appl. No.: 14/058,522

(22) Filed: Oct. 21, 2013

(65) Prior Publication Data

US 2015/0111071 A1    Apr. 23, 2015

(51) Int. Cl.
*H01M 4/70* (2006.01)
*B60L 50/64* (2019.01)
*H01M 50/531* (2021.01)
*H01M 50/543* (2021.01)

(52) U.S. Cl.
CPC ............. *H01M 4/70* (2013.01); *B60L 50/64* (2019.02); *H01M 50/531* (2021.01); *H01M 50/543* (2021.01); *H01M 2220/20* (2013.01); *Y02T 10/70* (2013.01); *Y02T 90/16* (2013.01)

(58) Field of Classification Search
CPC ........... H01M 2/26; H01M 2/30; H01M 4/70; H01M 2220/20; H01M 50/531; H01M 50/543; B60L 50/64; Y02T 90/16; Y02T 10/70
See application file for complete search history.

(56) References Cited

U.S. PATENT DOCUMENTS

| | | | |
|---|---|---|---|
| 2010/0151312 A1* | 6/2010 | Kim | H01M 2/202 |
| | | | 429/158 |
| 2011/0076553 A1 | 3/2011 | Kameda et al. | |
| 2012/0100761 A1 | 4/2012 | Grobe et al. | |
| 2012/0183844 A1 | 7/2012 | Ota et al. | |

FOREIGN PATENT DOCUMENTS

| | | |
|---|---|---|
| CN | 102130319 | 7/2011 |
| CN | 202134602 | 2/2012 |
| JP | 2010272324 | 12/2010 |
| JP | 2013161692 | 8/2013 |
| KR | 20090103428 | 10/2009 |
| WO | 201095224 | 8/2010 |

OTHER PUBLICATIONS

English translation of JP 2013-161692.*

* cited by examiner

*Primary Examiner* — Stephen J Yanchuk
(74) *Attorney, Agent, or Firm* — David Kelley, Esq.; Carlson, Gaskey & Olds, P.C.

(57) ABSTRACT

An example electric vehicle battery current communication device includes a terminal landing and a transition from the terminal landing having an area that is both bent and tapered. The transition can bend toward an interior of a battery cell such that a portion of the transition is closer to the interior than each portion of the terminal landing. The terminal landing can attach to a bus bar. The terminal landing can also weld to a bus bar. The transition can extend from the terminal landing to a current collector extending into an interior of the battery cell.

6 Claims, 4 Drawing Sheets

ELECTRIC VEHICLE BATTERY CURRENT COMMUNICATION DEVICE

BACKGROUND

This disclosure relates generally to an electric vehicle battery and, more particularly, to a current communication device for electrically connecting bus bars to the electric vehicle battery.

Generally, electric vehicles differ from conventional motor vehicles because electric vehicles are selectively driven using one or more battery-powered electric machines. Conventional motor vehicles, by contrast, rely exclusively on an internal combustion engine to drive the vehicle. Electric vehicles may use electric machines instead of, or in addition to, the internal combustion engine.

Example electric vehicles include hybrid electric vehicles (HEVs), plug-in hybrid electric vehicles (PHEVs), and battery electric vehicles (BEVs). Electric vehicles are typically equipped with a battery pack containing multiple battery cells that store electrical power for powering the electric machine. The battery cells may be charged prior to use, and recharged during drive by a regeneration brake or engine.

Current communication devices communicate current between the battery cells via a bus bar. Balancing the packaging of the current communication devices with the ease of manufacturing the current communication devices is often difficult.

SUMMARY

An electric vehicle battery current communication device according to an exemplary aspect of the present disclosure includes, among other things, a terminal landing, and a transition from the terminal landing having an area that is both bent and tapered.

In a further non-limiting embodiment of the foregoing current communication device, the terminal landing is to attach to a bus bar.

In a further non-limiting embodiment of any of the foregoing current communication devices, the terminal landing is to weld to a bus bar.

In a further non-limiting embodiment of any of the foregoing current communication devices, the device includes a current collector, and the transition extends from the terminal landing to the current collector.

In a further non-limiting embodiment of any of the foregoing current communication devices, the transition at the terminal has a first width and the transition at the current collector has a second width, and a ratio of the first width to the second width is from 2.19 to 3.23.

In a further non-limiting embodiment of any of the foregoing current communication devices, at least a portion of the current collector is received within an electric vehicle battery cell housing.

In a further non-limiting embodiment of any of the foregoing current communication devices, the terminal landing is disposed along a first plane and the current collector is disposed along a second plane that is transverse to the first plane.

In a further non-limiting embodiment of any of the foregoing current communication devices, the first plane is 90 degrees offset from the second plane.

In a further non-limiting embodiment of any of the foregoing current communication devices, the entire transition portion is both bent and tapered.

A method of communicating current with an electric vehicle battery according to another exemplary aspect of the present disclosure includes communicating current between a terminal landing and a transition connected to the terminal landing. The current communicates through an area of the transition that is both bent and tapered.

In a further non-limiting embodiment of the foregoing method, the method includes communicating current between the terminal landing and a bus bar.

In a further non-limiting embodiment of any of the foregoing methods, the terminal landing is welded to the bus bar.

In a further non-limiting embodiment of any of the foregoing methods, the transition extends from the terminal landing to a current collector.

In a further non-limiting embodiment of any of the foregoing methods, the transition at the terminal has a first width and the transition at the current collector has a second width, and a ratio of the first width to the second width is from 2.19 to 3.23.

In a further non-limiting embodiment of any of the foregoing methods, at least a portion of the current collector is received within an electric vehicle battery cell housing.

In a further non-limiting embodiment of any of the foregoing methods, the terminal landing is disposed along a first plane and the current collector is disposed along a second plane that is transverse to the first plane.

In a further non-limiting embodiment of any of the foregoing methods, the first plane is 90 degrees offset from the second plane.

In a further non-limiting embodiment of any of the foregoing methods, the entire transition portion is both bent and tapered.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
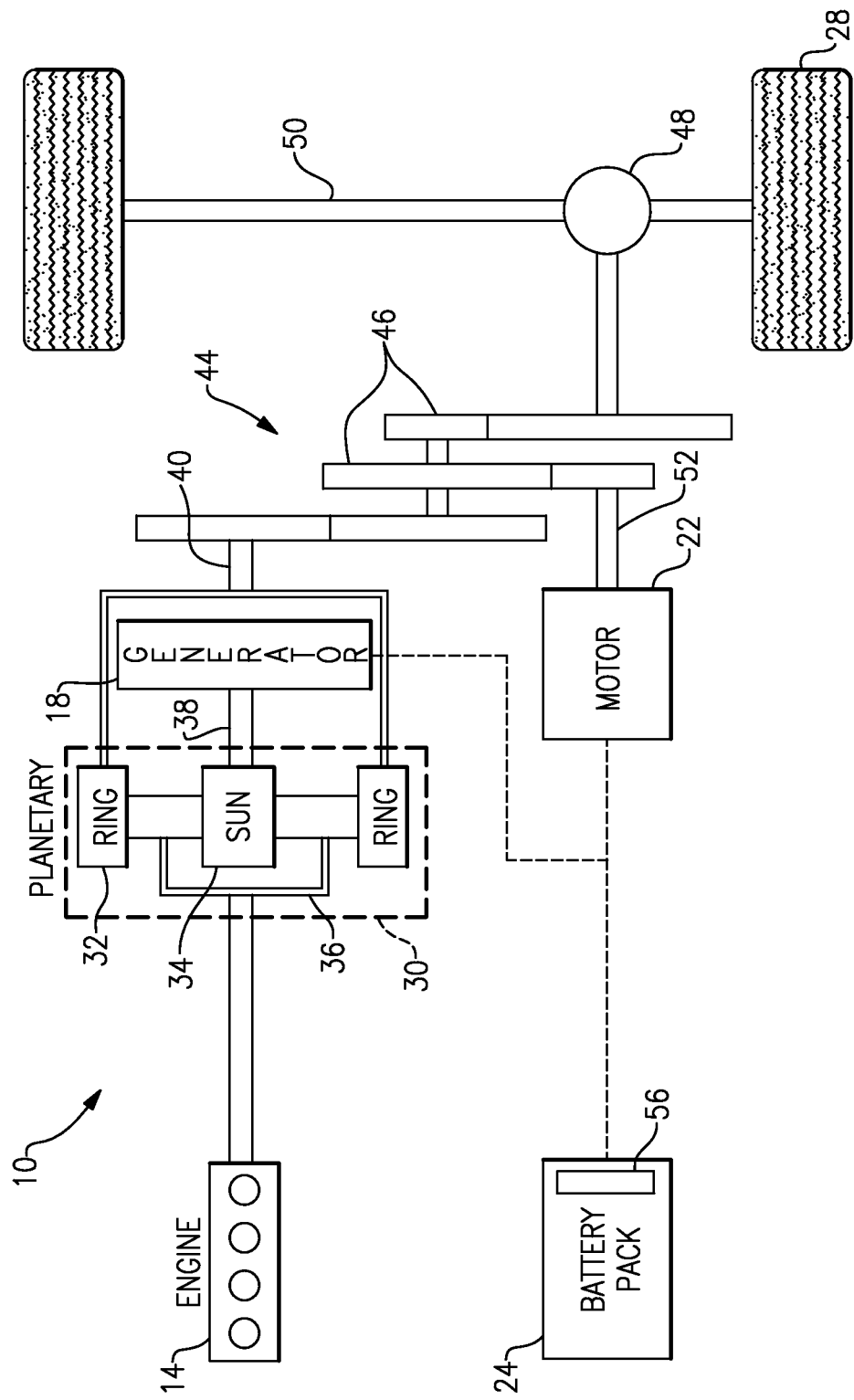
FIG. 1 illustrates a schematic view of an example electric vehicle powertrain.

FIG. 1 schematically illustrates a powertrain 10 for an electric vehicle. Although depicted as a hybrid electric vehicle (HEV), it should be understood that the concepts described herein are not limited to HEVs and could extend to other electrified vehicles, including but not limited to, plug-in hybrid electric vehicles (PHEVs) and battery electric vehicles (BEVs).

In one embodiment, the powertrain 10 is a powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electric vehicle.

The engine 14, which is an internal combustion engine in this example, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 may be driven by engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24 through a bus bar 56.

The battery pack 24 is an example type of electric vehicle battery assembly. The battery pack 24 may be a high voltage battery that is capable of outputting electrical power to operate the motor 22 and the generator 18. Other types of energy storage devices and/or output devices can also be used with the electric vehicle.

Figure 2:
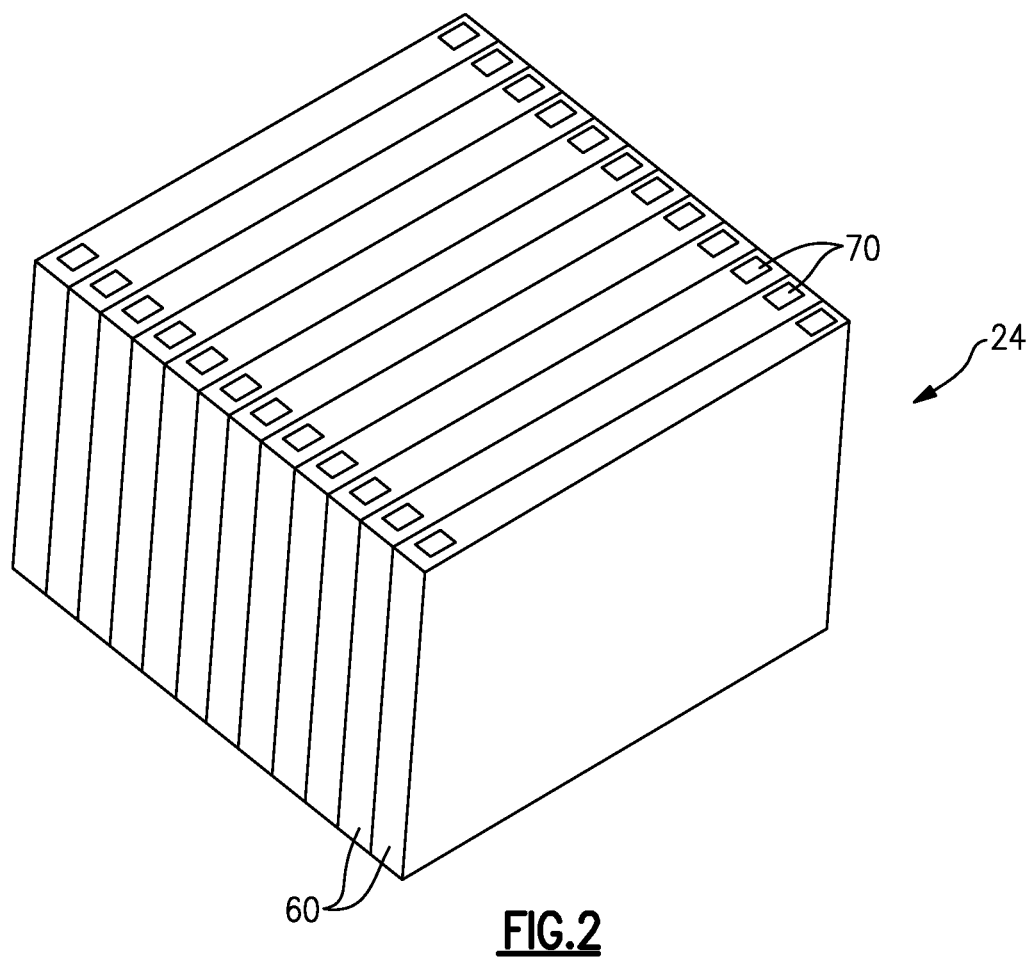
FIG. 2 illustrates a highly schematic perspective view of an example battery pack within the electric vehicle powertrain of FIG. 1.

Referring now to FIG. 2, the battery pack 24 includes a plurality of battery cells 60 that store power generated within the powertrain 10. The power is selectively communicated away from the battery cells 60 and used to drive the motor 22. The battery cells 60 are lithium ion based in this example.

Current communicates to and from each of the example battery cells 60 through a plurality of terminal landings 70. The bus bar 56 electrically couples together the plurality of terminal landings 70. The bus bar 56 is a relatively high voltage bus that is also in electrical communication with the motor 22 and the generator 18. The bus bar 56 can be welded to the terminal landings 70. The weld is a laser weld including lap joints in some examples.

Figure 3:
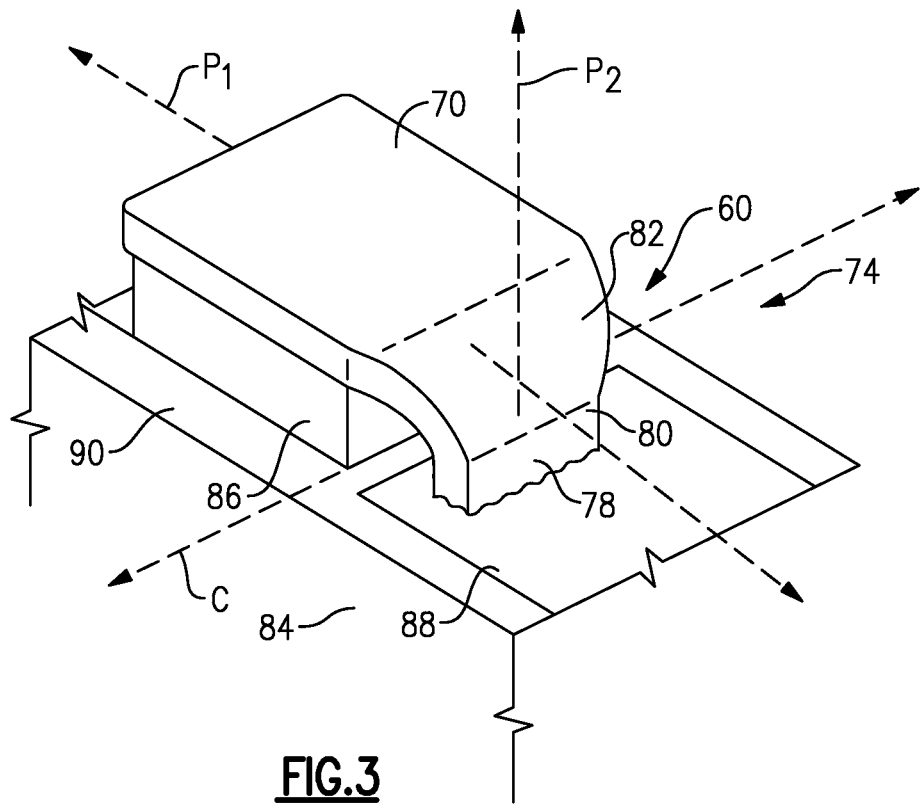
FIG. 3 shows a perspective view of a portion of an example current communication device used with the battery pack of FIG. 2.
Figure 4:
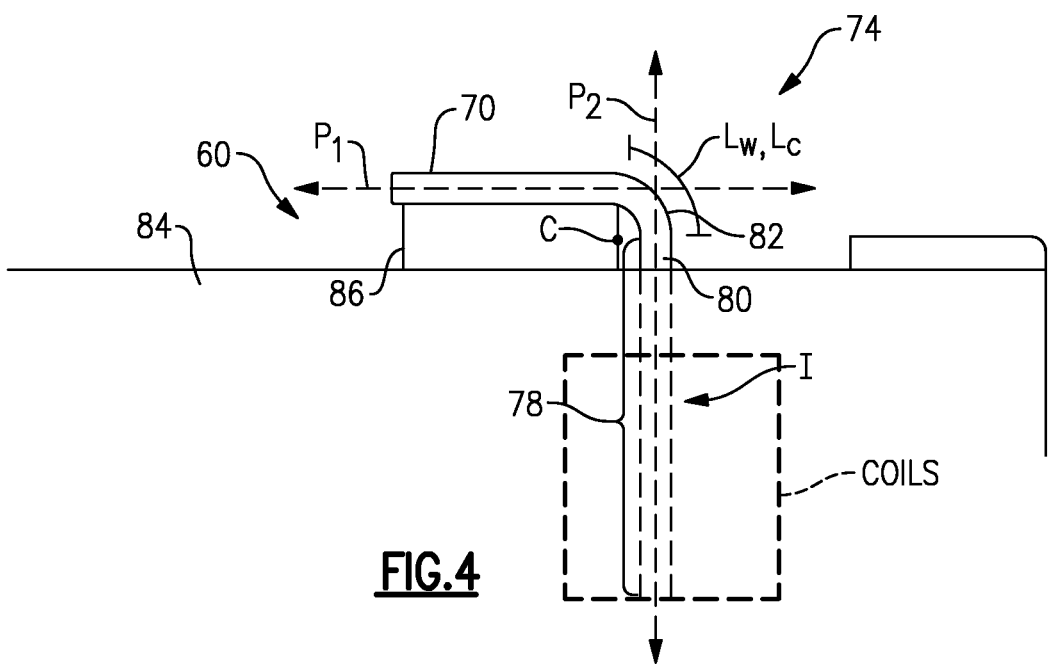
FIG. 4 shows a side view of the terminal device of FIG. 3.
Figure 5:
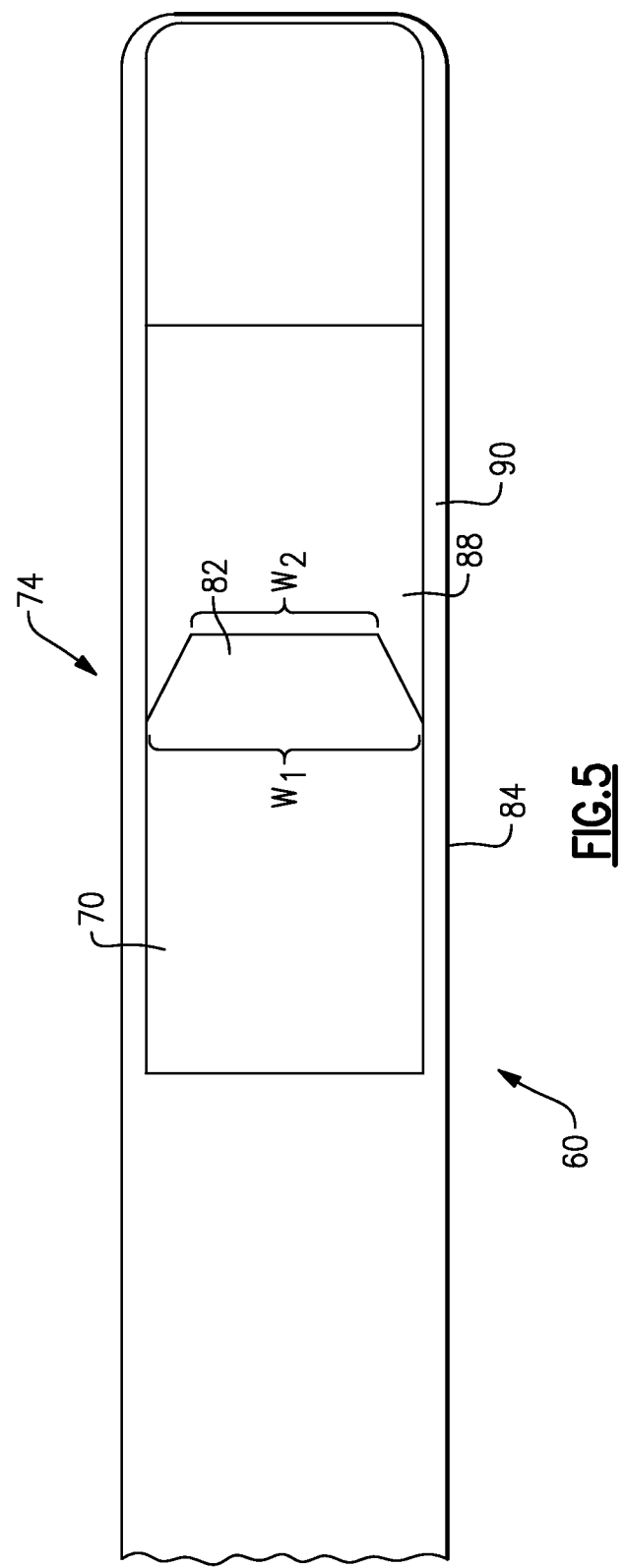
FIG. 5 shows a top view of the terminal device of FIG. 3.

Referring now to FIGS. 3 to 5, an electric vehicle current communication device 74 includes the terminal landings 70 in this example. The current communication device 74 also includes a current collector 78 that extends into the battery cells 60. A transition 82 of the current communication device 74 connects the terminal landing 70 to the current collector 78. An inner portion I of the current collector 78 is received within a housing 84 of the battery cell 60.

The terminal landings 70 are spaced from a top 90 of the battery cell housing 84. A support 86 is placed between the terminal landing 70 and the top 90 to prevent or to inhibit deflection downward of the terminal landing 70, especially when securing the bus bar 56 to the terminal landing 70.

When the battery cells 60 provide power to drive the motor 22, the current collector 78 receives current from coils within the battery cells 60. The current flows through the current collector 78, through the transition 82, and to the terminal landing 70. The bus bar 56 (FIG. 1) is coupled to the terminal landing 70 and receives the current from the terminal landing 70. The current electrically communicates from the bus bar 56 to the motor 22.

When power is delivered to the battery cells 60, the flow of current moves from the bus bar 56 through the terminal landing 70, through the transition 82, and to the current collector 78. Current storage areas within the battery cell 60 receive the current from the current collector 78.

The terminal landing 70 is disposed along a first plane $P_1$. A portion 80 of the current collector 78 extending from the battery cell 60 is disposed along a second plane $P_2$ The plane $P_1$ is transverse to the plane $P_2$. In this example, the plane $P_1$ is perpendicular to the plane $P_2$.

The transition 82 accommodates the different orientation of the terminal landing 70 and the current collector 78. The transition 82 is bent to accommodate this difference. In this example, the transition 82 is bent ninety degrees.

The width $W_1$ of the terminal landing 70 is greater than a width $W_2$ of the portion 80 of the current collector 78 extending from the battery cell 60. The width $W_1$ of the terminal landing 70 provides a relatively large area for securing the bus bar 56 to the terminal landing 70. The width $W_2$ is reduced relative to the width $W_1$ so that the portion 80 of the current collector 78 extending from the battery cell 60 maintains an appropriate clearance.

In this example, the portion 80 of the current collector 78 extending from the battery cell 60 extends through a molding 88. The molding 88 is positioned between the portion 80 and the top 90 of the battery cell 60. The molding 88 can be a plastic material, and the top 90 can be a metallic material. At least the material of the molding 88 and relatively narrow width $W_2$ of the portion 80 inhibits undesirable electrical contact between the portion 80 and the top 90.

To accommodate the different orientations of the terminal landing 70 and the portion 80 of the current collector 78 extending from the battery cell 60, the transition 82 tapers and bends. The taper is a change in width along a length $L_w$. The bend is curved along a length $L_c$. The curvature is relative to an axis C.

In this example, the length $L_w$ is the same as the length $L_c$. In other examples, the length $L_w$ is greater or less than the $L_c$. Even in these examples, some of the length $L_w$ overlaps some of the length $L_c$ such that some of the transition 82 is tapered and bent along the same area.

In this example, the entire transition 82 is both tapered and bent. The transition 82 extends from the terminal landing 70 to the portion of the current collector 78 extending from the battery cell 60. Thus, the example lengths $L_w$ and $L_c$ also extend from the terminal landing 70 to the current collector 78.

In this example, the width $W_1$ of the terminal landing 70 is from 9 millimeters to 10 millimeters. Also, the width $W_2$ of the portion of the current collector 78 extending from the battery cell 60 is from 3.1 millimeters to 4.1 millimeters. A ratio of the width $W_1$ to the width $W_2$ is thus from 2.19 to 3.23. Having a transition 82 within this ratio that bends and tapers provides, among other things, capable current carrying capacity within a relatively small packaging footprint and relatively minimal material usage. In other examples, other dimensions and ratios are used.

The example current communication device is formed of a single piece of material. In some examples, the current communication device 74 is formed via a stamping process from a sheet of material stock.

Features of the disclosed examples include a device that communicates between a bus bar and an interior of a battery cell. The device includes relatively few sharp (low radius) stamping bends, which lessens potential stretching and stressing issues. The device occupies a relatively small packaging area by including an overlapping taper and bend, which eliminates the space required to taper and then bend. The disclosed examples may further provide a weight or cost reduction.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. An electric vehicle battery current communication device, comprising:
   a terminal landing; and
   a transition extending from the terminal landing to a current collector, the transition concurrently bent and tapered such that a bending of the transition is coincident with a tapering of the transition, the transition configured to bend toward an interior of a battery cell such that a portion of the transition is closer to the interior than each portion of the terminal landing, the terminal landing having a first width where the terminal landing meets the transition, the current collector having a second width where the current collector meets the transition and where the current collector extends through a molding in the battery cell, the second width being less than the first width,
   wherein the terminal landing is disposed along a first plane aligned and spaced a distance from the battery cell, and the current collector is disposed along a second plane that is transverse to the first plane, and
   wherein the entire transition is both bent and tapered.

2. The electric vehicle battery current communication device of claim 1, wherein the terminal landing is configured to attach to a bus bar.

3. The electric vehicle battery current communication device of claim 1, wherein the terminal landing is configured to weld to a bus bar.

4. The electric vehicle battery current communication device of claim 1, wherein the transition at the terminal has a first width and the transition at the current collector has a second width, and a ratio of the first width to the second width is from 2.19 to 3.23.

5. The electric vehicle battery current communication device of claim 1, wherein at least a portion of the current collector is received within an electric vehicle battery cell housing.

6. The electric vehicle battery current communication device of claim 1, wherein the first plane is 90 degrees offset from the second plane.

* * * * *